US010975767B2

(12) United States Patent
Terauchi et al.

(10) Patent No.: US 10,975,767 B2
(45) Date of Patent: Apr. 13, 2021

(54) BLEEDING STRUCTURE FOR GAS TURBINE ENGINE

(71) Applicant: KAWASAKI JUKOGYO KABUSHIKI KAISHA, Kobe (JP)

(72) Inventors: Koji Terauchi, Kobe (JP); Daisuke Uemura, Kobe (JP); Takuya Ikeguchi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 88 days.

(21) Appl. No.: 15/969,425

(22) Filed: May 2, 2018

(65) Prior Publication Data

US 2018/0252159 A1    Sep. 6, 2018

Related U.S. Application Data

(63) Continuation of application No. PCT/JP2016/080778, filed on Oct. 18, 2016.

(30) Foreign Application Priority Data

Nov. 5, 2015   (JP) .............................. JP2015-217813

(51) Int. Cl.
*F02C 6/08*      (2006.01)
*F01D 25/14*   (2006.01)
(Continued)

(52) U.S. Cl.
CPC .................. *F02C 6/08* (2013.01); *F01D 9/04* (2013.01); *F01D 9/06* (2013.01); *F01D 17/105* (2013.01);
(Continued)

(58) Field of Classification Search
CPC ...... F02C 6/08; F02C 7/18; F02C 7/12; F01D 25/14; F01D 9/06; F01D 11/20–24; F23R 3/46
See application file for complete search history.

(56) References Cited

U.S. PATENT DOCUMENTS 3,520,635 A * 7/1970 Ivanko ..................... F01D 11/18
415/138
3,975,901 A * 8/1976 Hallinger ................ F01D 11/24
60/786
(Continued)

FOREIGN PATENT DOCUMENTS

EP        2987965 A1 *  2/2016 ............. F01D 19/00
JP     2001-107748 A    4/2001

OTHER PUBLICATIONS

International Search Report for PCT/JP2016/080778, dated Dec. 13, 2016 (PCT/ISA/210).

*Primary Examiner* — Gerald L Sung
*Assistant Examiner* — Marc J Amar
(74) *Attorney, Agent, or Firm* — Sughrue Mion, PLLC

(57) ABSTRACT

Provided is a structure for bleeding gas from a chamber for receiving compressed gas from a compressor of a gas turbine engine and supplying the compressed gas to a combustor. The structure includes: a turbine casing covering an outer circumference of a turbine; an engine housing forming, between the engine housing and the turbine casing, a bleeding space that communicates with the chamber; a bleeding duct through which compressed gas in the bleeding space is guided to the outside of the engine housing; and an annular partitioning member arranged on an upstream side, relative to the bleeding duct in the bleeding space so as to separate the bleeding space from the chamber, and having a plurality of communication holes through which an
(Continued)

upstream side and a downstream side relative to the partitioning member communicate with each other.

19 Claims, 5 Drawing Sheets

(51) Int. Cl.
    *F01D 17/10*     (2006.01)
    *F01D 9/06*     (2006.01)
    *F02C 7/18*     (2006.01)
    *F01D 9/04*     (2006.01)

(52) U.S. Cl.
    CPC ............... *F01D 25/14* (2013.01); *F02C 7/18* (2013.01); *F05D 2220/32* (2013.01); *F05D 2240/12* (2013.01); *F05D 2240/14* (2013.01); *F05D 2260/605* (2013.01); *F05D 2270/082* (2013.01)

(56) References Cited

U.S. PATENT DOCUMENTS

| | | | | |
|---|---|---|---|---|
| 4,297,843 A * | 11/1981 | Sato | ............... | F01D 9/023 60/39.37 |
| 4,413,470 A * | 11/1983 | Scheihing | ............... | F23R 3/40 60/800 |
| 5,160,241 A * | 11/1992 | Glynn | ............... | F01D 9/06 415/116 |
| 5,363,641 A * | 11/1994 | Dixon | ............... | F02C 6/08 60/226.1 |
| 5,611,197 A * | 3/1997 | Bunker | ............... | F02C 7/185 415/115 |
| 5,980,201 A * | 11/1999 | Benoist | ............... | F01D 25/14 415/115 |
| 6,065,282 A * | 5/2000 | Fukue | ............... | F02C 7/185 415/115 |
| 6,227,800 B1 * | 5/2001 | Spring | ............... | F01D 11/24 415/116 |
| 6,532,744 B1 * | 3/2003 | Reiter | ............... | F02C 7/18 415/115 |
| 7,770,375 B2 * | 8/2010 | Alvanos | ............... | F02C 7/05 60/39.091 |
| 10,427,075 B2 * | 10/2019 | Jennings | ............... | F01D 25/32 |
| 10,619,564 B2 * | 4/2020 | Takamura | ............... | F01D 11/24 |
| 2002/0157400 A1 * | 10/2002 | Schulten | ............... | F23R 3/46 60/772 |
| 2005/0072162 A1 * | 4/2005 | Hoff | ............... | F02C 6/08 60/785 |
| 2005/0150232 A1 * | 7/2005 | Dittmann | ............... | F01D 25/12 60/782 |
| 2006/0026833 A1 * | 2/2006 | Imbourg | ............... | F01D 25/14 29/890.01 |
| 2006/0140754 A1 * | 6/2006 | Tanioka | ............... | F01D 17/02 415/173.1 |
| 2010/0011779 A1 * | 1/2010 | Senior | ............... | F23R 3/26 60/785 |
| 2010/0074745 A1 * | 3/2010 | Jones | ............... | F01D 25/246 415/209.3 |
| 2010/0162722 A1 * | 7/2010 | McQuiggan | ............... | F01D 11/04 60/782 |
| 2010/0275603 A1 * | 11/2010 | Saito | ............... | F23R 3/46 60/737 |
| 2010/0275613 A1 * | 11/2010 | Alasti | ............... | F04D 29/522 60/785 |
| 2010/0288376 A1 * | 11/2010 | Haasz | ............... | F01D 9/065 137/468 |
| 2011/0027068 A1 * | 2/2011 | Floyd, II | ............... | F01D 11/24 415/13 |
| 2011/0076135 A1 * | 3/2011 | Gendraud | ............... | F01D 11/24 415/119 |
| 2011/0135456 A1 * | 6/2011 | Takahashi | ............... | F01D 11/24 415/180 |
| 2011/0138818 A1 * | 6/2011 | Mizukami | ............... | F04D 27/0207 60/39.12 |
| 2011/0314828 A1 * | 12/2011 | Bil | ............... | F01D 9/065 60/751 |
| 2012/0266601 A1 * | 10/2012 | Miller | ............... | F01D 21/00 60/772 |
| 2013/0039753 A1 * | 2/2013 | Ikeguchi | ............... | F04D 29/542 415/207 |
| 2013/0047575 A1 * | 2/2013 | Sakai | ............... | F04D 27/0207 60/39.12 |
| 2013/0156541 A1 * | 6/2013 | Eleftheriou | ............... | F01D 11/20 415/1 |
| 2013/0266418 A1 * | 10/2013 | Snook | ............... | F01D 11/24 415/1 |
| 2014/0260264 A1 * | 9/2014 | Stoia | ............... | F02C 6/08 60/734 |
| 2014/0373504 A1 * | 12/2014 | Broker | ............... | F01D 25/30 60/39.5 |
| 2015/0098854 A1 * | 4/2015 | Wright | ............... | B22F 3/15 419/8 |
| 2015/0354822 A1 * | 12/2015 | Suciu | ............... | F23R 3/10 60/772 |
| 2015/0377127 A1 * | 12/2015 | DiBenedetto | ............... | F02C 6/08 415/144 |
| 2016/0208703 A1 * | 7/2016 | Hill | ............... | F01D 25/12 |
| 2016/0230663 A1 * | 8/2016 | Mizukami | ............... | F02C 9/18 |
| 2017/0114652 A1 * | 4/2017 | Wiebe | ............... | F01D 9/023 |
| 2017/0306846 A1 * | 10/2017 | Laing | ............... | F02C 7/00 |
| 2017/0350265 A1 * | 12/2017 | McLaughlin | ............... | F01D 25/12 |
| 2017/0350269 A1 * | 12/2017 | Miranda | ............... | F01D 11/24 |
| 2018/0223683 A1 * | 8/2018 | Tham | ............... | F01D 11/001 |
| 2018/0340468 A1 * | 11/2018 | Takamura | ............... | F01D 5/087 |
| 2019/0390569 A1 * | 12/2019 | Bunel | ............... | F01D 11/24 |
| 2020/0025041 A1 * | 1/2020 | Stevens | ............... | F01D 25/14 |

\* cited by examiner

BLEEDING STRUCTURE FOR GAS TURBINE ENGINE

CROSS REFERENCE TO THE RELATED APPLICATION

This application is a continuation application, under 35 U.S.C. § 111(a), of international application No. PCT/JP2016/080778, filed Oct. 18, 2016, which claims priority to Japanese patent application No. 2015-217813, filed Nov. 5, 2015, the disclosure of which are incorporated by reference in their entirety into this application.

BACKGROUND OF THE INVENTION

Field of the Invention

The present invention relates to a structure for bleeding gas compressed by a compressor of a gas turbine engine to the outside of the engine.

Description of Related Art

Regarding a gas turbine engine, it is generally known that, by providing a bleeding structure in which compressed air flowing from a compressor toward a combustor is bled to the outside of the engine, the combustion temperature is maintained even at the time of partial load operation so that combustion stability is ensured, and discharge of air pollutants such as NOx is suppressed (e.g., refer to Patent Document 1).

RELATED DOCUMENT

Patent Document

[Patent Document 1] US Patent Application Publication No. 2010/0011779

SUMMARY OF THE INVENTION

However, in a case where such a bleeding structure is provided to a gas turbine engine, compressed air flowing from a compressor toward a combustor needs to be prevented from flowing unevenly in the circumferential direction, in order to allow combustion in the combustor to be uniform in the circumferential direction thereby to achieve stable combustion. Therefore, normally, a large number of bleeding ducts need to be arranged, in the circumferential direction, at an outer circumferential portion of a casing of the engine, and a manifold for collecting air bled through these bleeding ducts needs to be provided at the outer circumferential portion, and thus, the size of the entire engine becomes large.

An object of the present invention is to provide, in order to solve the above-described problem, a gas turbine engine bleeding structure in which, while a space and a component in a gas turbine engine are used so as to prevent the size of the entire engine from becoming large, uneven flow of gas in the engine is suppressed so that stable combustion can be ensured.

In order to attain the above-described object, a bleeding structure according to the present invention is a structure, in a gas turbine engine, for bleeding a compressed gas from a chamber for receiving a compressed gas from a compressor and supplying the compressed gas to a combustor, the bleeding structure including: a turbine casing that covers an outer circumference of a turbine of the gas turbine engine; an engine housing that surrounds the turbine casing and forms, between the engine housing and the turbine casing, a bleeding space that communicates with the chamber; a bleeding duct provided to the engine housing, and configured to guide the compressed gas in the bleeding space to an outside of the engine housing; and an partitioning member of an annular shape arranged on an upstream side, relative to the bleeding duct, in the bleeding space so as to separate the bleeding space from the chamber, and having a plurality of communication holes through which an upstream side and a downstream side relative to the partitioning member communicate with each other.

With this configuration, the compressed gas in the chamber collides with the partitioning member and flows in the circumferential direction, and is subsequently bled through the plurality of communication holes of the partitioning member toward the downstream side. Therefore, the compressed gas flowing from the compressor toward the combustor is prevented from flowing unevenly in the circumferential direction. Furthermore, such an effect is obtained by providing the partitioning member that separates the bleeding space from the chamber, and thus, while the size of the entire gas turbine engine is prevented from becoming large, uneven flow of compressed gas in the circumferential direction in the engine at the time of bleeding is suppressed, whereby stable combustion can be ensured in the combustor.

In one embodiment of the present invention, in order for the partitioning member to be elastic, for example, the partitioning member may include a body portion extending in a radial direction, and an outer-diameter-side leg portion and an inner-diameter-side leg portion respectively extending in an axial direction from radially opposite ends of the body portion, in a longitudinal cross-sectional view along the axial direction, and the plurality of communication holes may be formed in the body portion. In addition, at least one of the outer-diameter-side leg portion and the inner-diameter-side leg portion of the partitioning member may be formed with a plurality of slits extending in the axial direction. With this configuration, by the simple structure, the partitioning member can be made elastic in the radial direction, and the compressed gas can be effectively prevented from leaking from a portion other than the communication holes of the partitioning member toward the downstream side.

In one embodiment of the present invention, the partitioning member may be attached to a turbine support member that supports the turbine on the engine housing. With this configuration, by effectively using an existing component of the gas turbine engine, increase in the number of parts such as a support member due to provision of the partitioning member can be suppressed.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, an embodiment of the present invention will be described with reference to the drawings, but the present invention is not limited to the embodiment.

Figure 1:
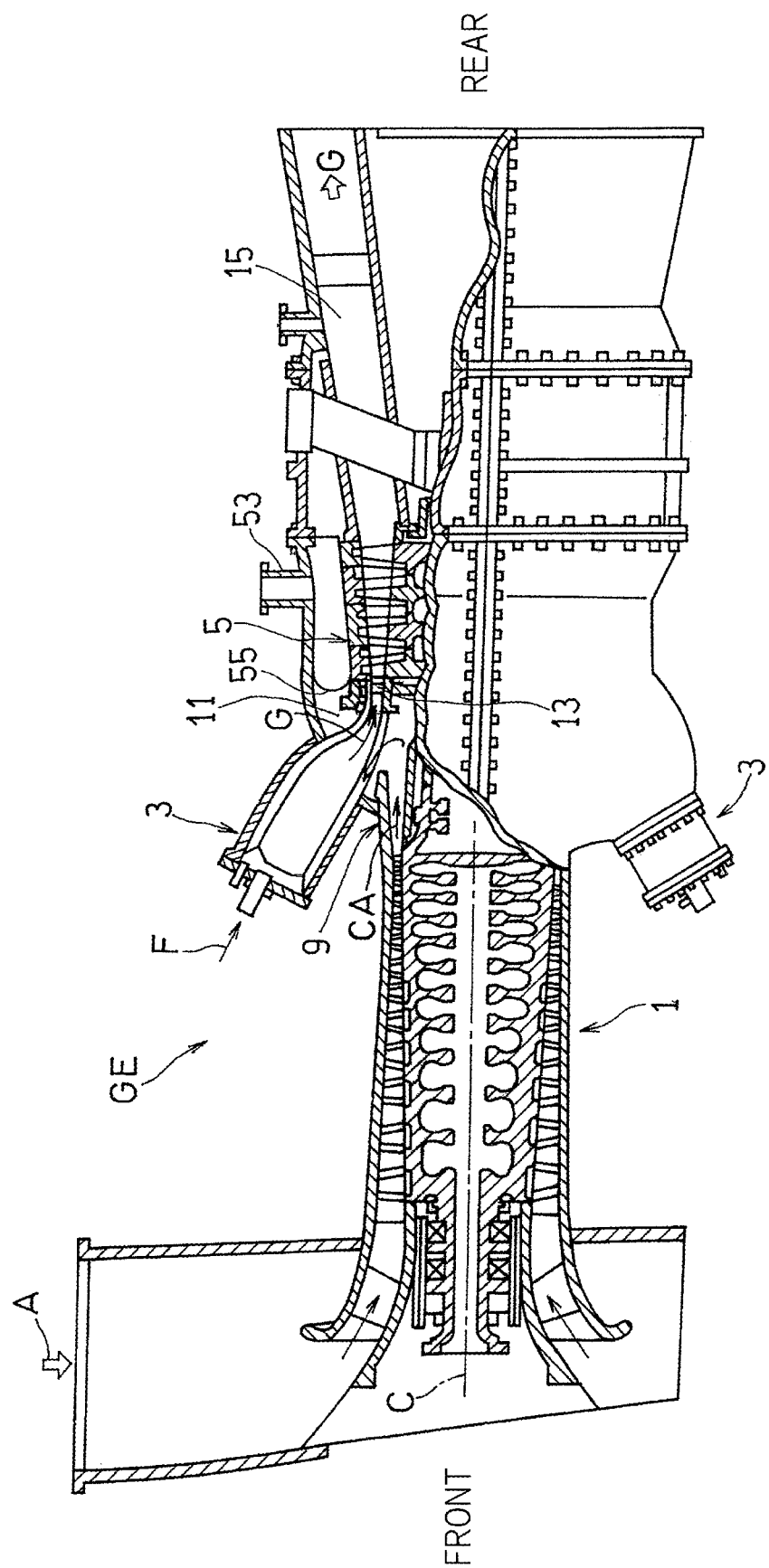
FIG. 1 is a partially-cut-away side view showing a schematic configuration of a gas turbine engine having a bleeding structure according to one embodiment of the present invention.

FIG. 1 is a partially-cut-away side view of a gas turbine engine (hereinafter, simply referred to as a gas turbine) GE having a bleeding structure according to one embodiment of the present invention. In the gas turbine GE, air A introduced from the outside is compressed by a compressor 1 and guided to a combustor 3, and fuel F is combusted together with a compressed air CA in the combustor 3, so that a turbine 5 is driven by the resultant high-temperature and high-pressure combustion gas G. In the present embodiment, a plurality of can-type combustors 3 are arranged at equal intervals along the circumferential direction of the gas turbine GE. In the description below, the compressor 1 side in the axis C direction of the gas turbine GE may be referred to as "front side", and the turbine 5 side in the axis C direction of the gas turbine GE may be referred to as "rear side". The terms "front" and "rear" included in the names of elements constituting the embodiment have the same meanings. In addition, in the description below, the terms "axial direction", "circumferential direction", and "radial direction" respectively mean the axis C direction, the circumferential direction, and the radial direction of the gas turbine GE, unless otherwise specified.

In the present embodiment, a compressor of an axial flow type is used as the compressor 1. The compressed air CA obtained by the compression by the axial-type compressor 1 passes through a diffuser 9 connected to a downstream end portion of the compressor 1, and subsequently flows into a chamber 11. The chamber 11 is a space that is formed on the periphery of the combustors 3 so as to communicate with an outlet of the compressor via the diffuser 9. The chamber 11 receives the compressed air CA from the compressor 1, and the compressed air CA is supplied through the chamber 11 to the combustors 3. High-temperature and high-pressure combustion gas G generated in the combustors 3 flows into the turbine 5. The combustion gas G having driven the turbine 5 is discharged, to the outside of the gas turbine GE, through an exhaust gas passage 15 connected to the downstream side (rear side) of the turbine 5.

Figure 2:
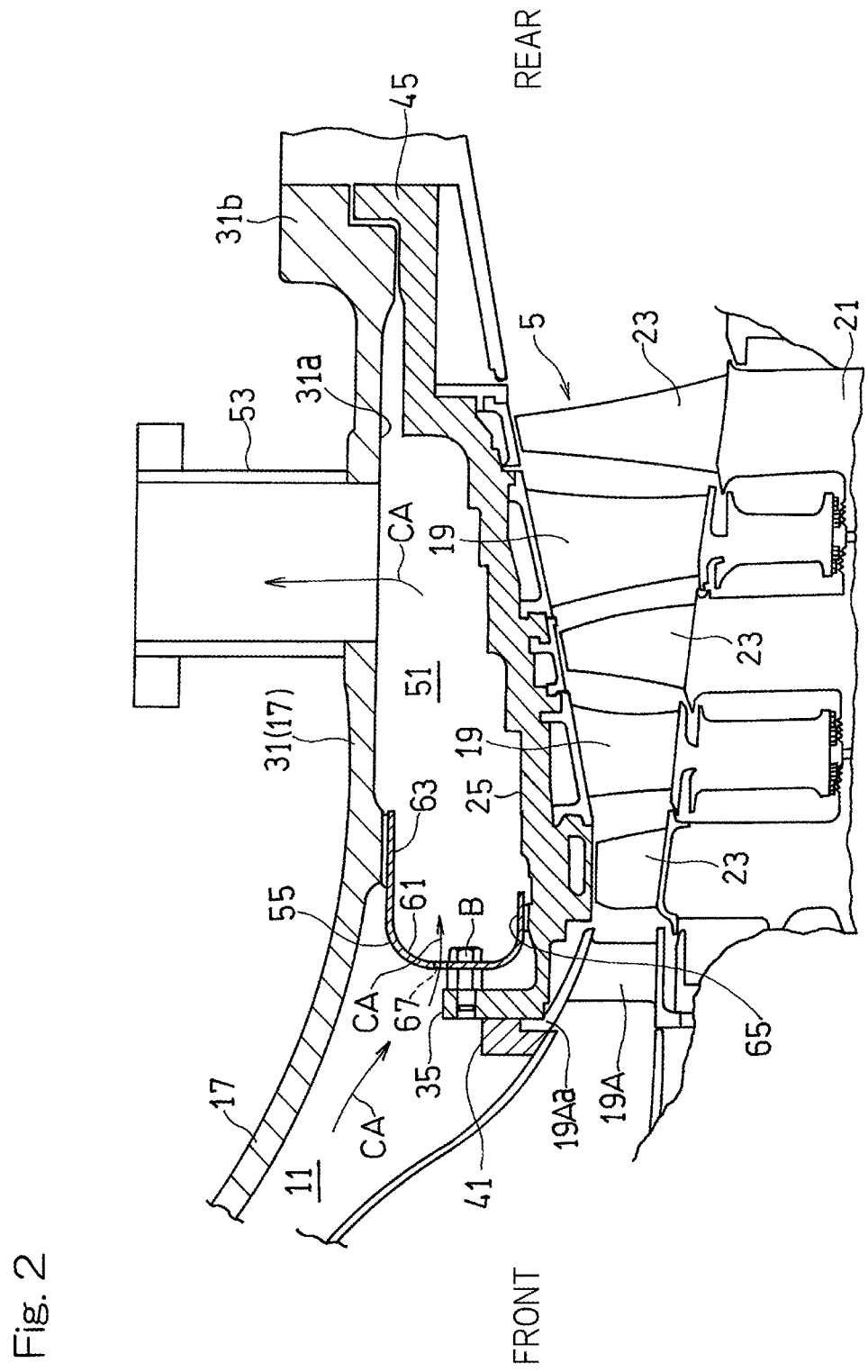
FIG. 2 is an enlarged longitudinal cross-sectional view showing an area at and around the bleeding structure of the gas turbine engine in FIG. 1.

As shown in FIG. 2, the turbine 5 includes: a large number of stator blades 19; and a large number of rotor blades 23 arranged on the outer circumferential surface of a rotor 21 forming a rotating portion of the gas turbine GE. The outer circumference of a first stage stator blade 19 (hereinafter, may be particularly referred to as "first stage stator blade 19A") at a front end forming an inlet of the turbine 5 and the outer circumferences of the stator blades 19, which are located rearward of the first stage stator blade 19, and the rotor blades 23, that is, the outer circumference of the turbine 5 is covered by a turbine casing 25. In the present embodiment, the turbine casing 25 that covers the outer circumference of the turbine 5 is connected and fixed to the inner side of an engine housing 17, and each stator blade 19 is mounted to the turbine casing 25. The turbine casing 25 is surrounded by the engine housing 17 that is a housing of the entire gas turbine GE. In this specification, a portion of the engine housing 17 that is positioned outward of the turbine 5 is referred to as a turbine housing portion 31. In the present embodiment, the turbine housing portion 31 has an inner circumference wall surface 31a formed as a flat cylindrical surface extending so as to be substantially parallel to the axial direction.

The turbine casing 25 includes a connection flange portion 35 protruding radially outward from the front end of the turbine casing 25. A front end portion 19Aa of the first stage stator blade 19A is positioned in the circumferential direction and the radial direction by the connection flange portion 35. In addition, the first stage stator blade 19A is positioned in the axial direction by the connection flange portion 35 and a support ring 41 fixed to a flange (not shown) provided on the inner circumferential surface of the engine housing 17.

As shown in FIG. 2, the turbine casing 25 has such a shape that the diameter thereof increases toward the rear side, and the rearmost end of a rear end portion of the turbine casing 25 has a rear end flange 45 that protrudes radially outward. The turbine casing 25 is supported, through the rear end flange 45, by a rear end portion 31b of the turbine housing portion 31 of the engine housing 17. Each stator blade 19 is supported by the turbine casing 25 by being engaged with an engagement mechanism provided on an inner circumference portion of the turbine casing 25. The structure by which the turbine casing 25 supports the stator blades 19 of the turbine 5 is not limited to the example described above.

A bleeding space 51, which communicates with the chamber 11, is formed between the turbine housing portion 31 of the engine housing 17 and the turbine casing 25 on the inner side of the turbine housing portion 31. The bleeding space 51 forms a bleeding path, in the gas turbine GE, through which the compressed air CA is bled from the chamber 11. The turbine housing portion 31 of the engine housing 17 is provided with a bleeding duct 53 configured to guide an air in the bleeding space 51 to the outside of the engine housing 17. In the present embodiment, the bleeding duct 53 is provided at only one location, in the circumferential direction, on the turbine housing portion 31. Although, in the shown example, the bleeding duct 53 is provided at an axial position on the turbine housing portion 31 that corresponds to the third stage stator blade 19, the axial position of the bleeding duct 53 is not limited to this example.

The bleeding space 51 is separated from the chamber 11 by a partitioning member 55 of an annular shape arranged on the front side, relative to the bleeding duct 53, in the space between the turbine housing portion 31 of the engine housing 17 and the turbine casing 25 on the inner side of the turbine housing portion 31. That is, the partitioning member 55 is arranged on the upstream side, relative to the bleeding duct 53, in the bleeding path through which the compressed air CA is bled from the chamber 11. The chamber 11 and the bleeding space 51 are separated from each other in the axial direction by the partitioning member 55, and the compressed air CA is guided from the bleeding space 51 on the downstream side (rear side) relative to the partitioning member 55 to the bleeding duct 53.

More specifically, the partitioning member 55 according to the present embodiment includes, in a longitudinal cross-sectional view along the axial direction, a body portion 61 extending in the radial direction, and an outer-diameter-side leg portion 63 and an inner-diameter-side leg portion 65 respectively extending in the axial direction from the radially opposite ends of the body portion 61. In other words, the partitioning member 55 is formed, in a longitudinal cross-sectional view along the axial direction, in a U shape (in a case where the lengths of the outer-diameter-side leg portion 63 and the inner-diameter-side leg portion 65 are equal to each other) or a J shape (in a case where lengths of the outer-diameter-side leg portion 63 and the inner-diameter-side leg portion 65 are different from each other). In the present embodiment, the partitioning member 55 is formed by bending a metallic sheet member, such that radial opposite end portions of the body portion 61 are curved toward the rear side. Since the outer-diameter-side leg portion 63 and the inner-diameter-side leg portion 65 having the above-described structure are provided in the partitioning member 55, the partitioning member 55 is elastic in the radial direction.

Figure 3:
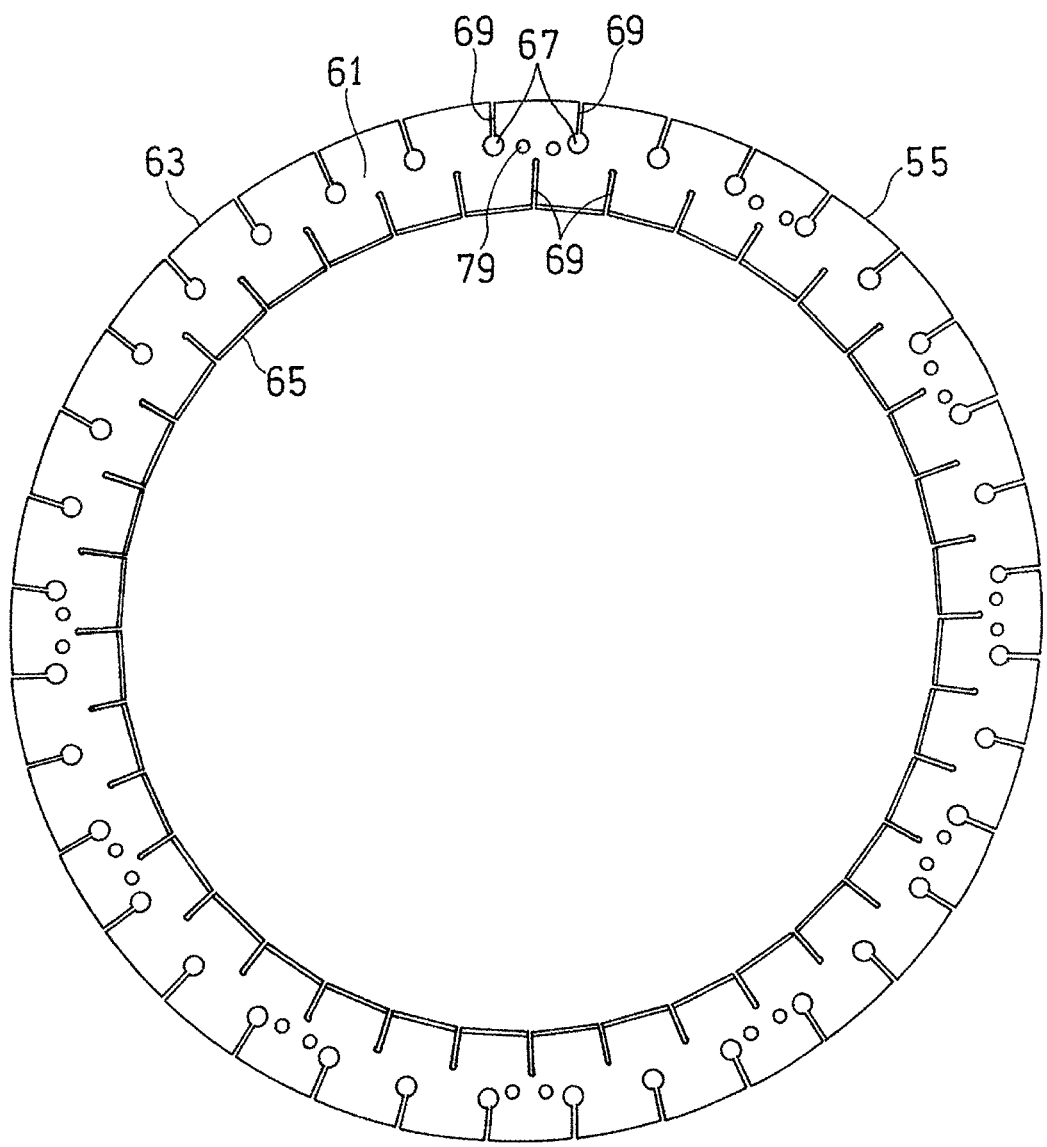
FIG. 3 is a front view showing a partitioning member used for the bleeding structure of the gas turbine engine in FIG. 2.

As shown in FIG. 3, the partitioning member 55 is formed with a plurality of communication holes 67 through which the upstream side and the downstream side relative to the partitioning member 55 communicate with each other. In the partitioning member 55 according to the present embodiment, the plurality of communication holes 67 are formed in the body portion 61. Although each communication hole 67 is formed as a circular hole in the shown example, the shape of the communication hole 67 is not limited to a circular shape. The plurality of communication holes 67 are arranged at equal intervals in the circumferential direction.

Figure 4:
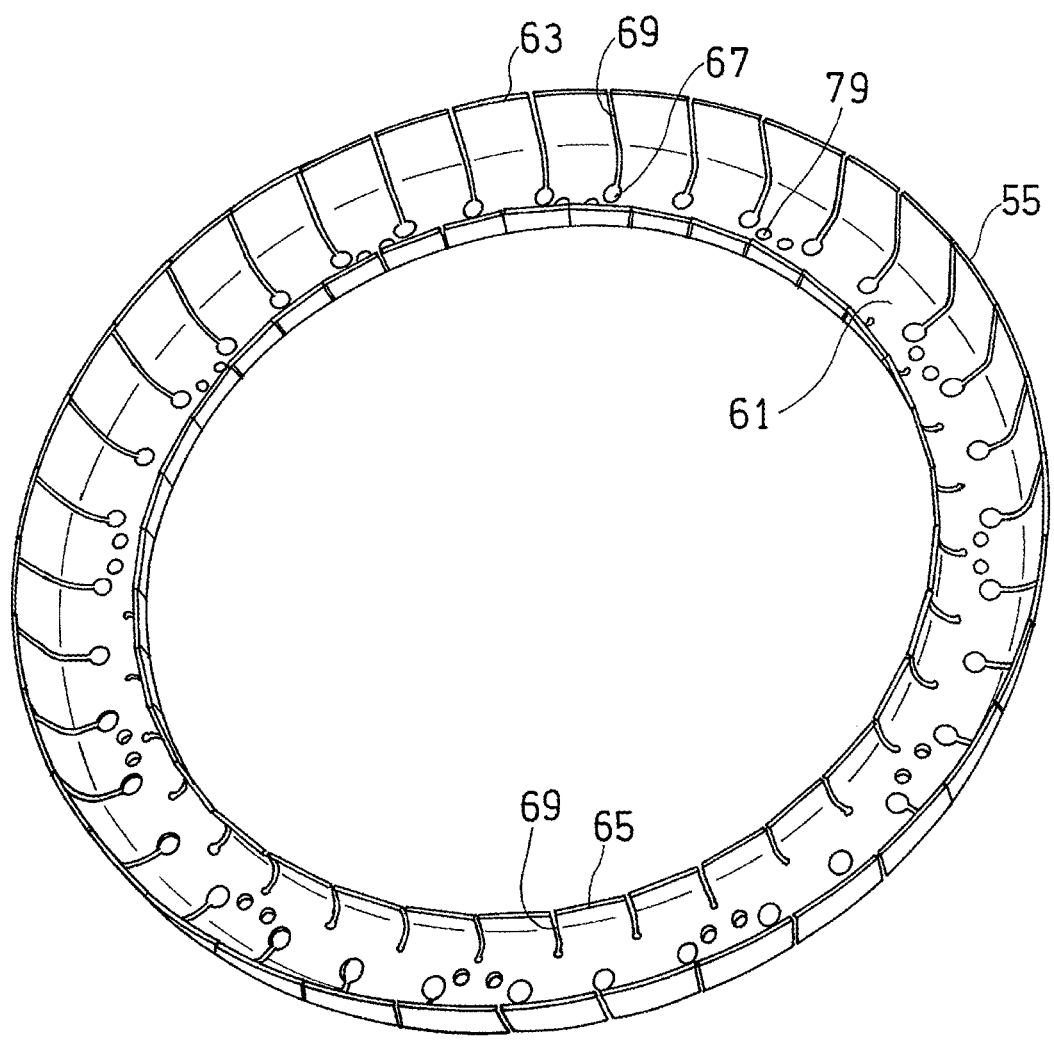
FIG. 4 is a perspective view of the partitioning member used for the bleeding structure of the gas turbine engine in FIG. 2 as viewed from behind.

As shown in FIG. 4, each of the outer-diameter-side leg portion 63 and the inner-diameter-side leg portion 65 of the partitioning member 55 is formed with a plurality of slits 69 in the form of axial cuts. In the shown example, in the outer-diameter-side leg portion 63, the slits 69 of which the number is the same as that of the communication holes 67 are formed at equal intervals in the circumferential direction. In addition, in the shown example, the slits 69 extend to respective communication holes 67 of the body portion 61 so as to open to the communication holes 67. Meanwhile, in the inner-diameter-side leg portion 65, one slit 69 is formed at an intermediate position, in the circumferential direction, between each two adjacent slits 69, 69 of the outer-diameter-side leg portion 63.

The slits 69 may be omitted. However, by forming the slits 69 in at least one of the outer-diameter-side leg portion 63 and the inner-diameter-side leg portion 65 of the partitioning member 55, the elasticity in the radial direction of the partitioning member 55 can be increased. In the present embodiment, the slits 69 are formed in each of the outer-diameter-side leg portion 63 and the inner-diameter-side leg portion 65, but the slits 69 may be formed in only one of the outer-diameter-side leg portion 63 and the inner-diameter-side leg portion 65 of the partitioning member 55. In addition, the number of the slits 69 and arrangement thereof are not limited to the shown example, but may be appropriately set.

Since the partitioning member 55 is made elastic in the radial direction, the compressed air CA is prevented from leaking from a portion other than the communication holes 67 of the partitioning member 55 to the downstream side, whereby uneven flow of the compressed air CA in the circumferential direction can be reliably suppressed. In particular, since, as shown in FIG. 2, an inner-diameter-side portion (the inner-diameter-side leg portion 65 in the present embodiment) of the partitioning member 55 is arranged on an outer circumferential portion of the turbine 5 whose temperature becomes high, the inner-diameter-side portion is thermally expanded to a great extent. Even in such an environment, since the partitioning member 55 is elastic, the contact between the partitioning member 55 and each of the engine housing 17 and the turbine casing 25 is ensured. The structure in which the partitioning member 55 is made elastic in the radial direction is not limited to the example described above.

The outer-diameter-side leg portion 63 of the partitioning member 55 is in contact with the engine housing 17, and the inner-diameter-side leg portion 65 is in contact with the turbine casing 25 that is a turbine support member. The body portion 61 of the partitioning member 55 is detachably fastened to the connection flange portion 35 of the turbine casing 25.

Figure 5:
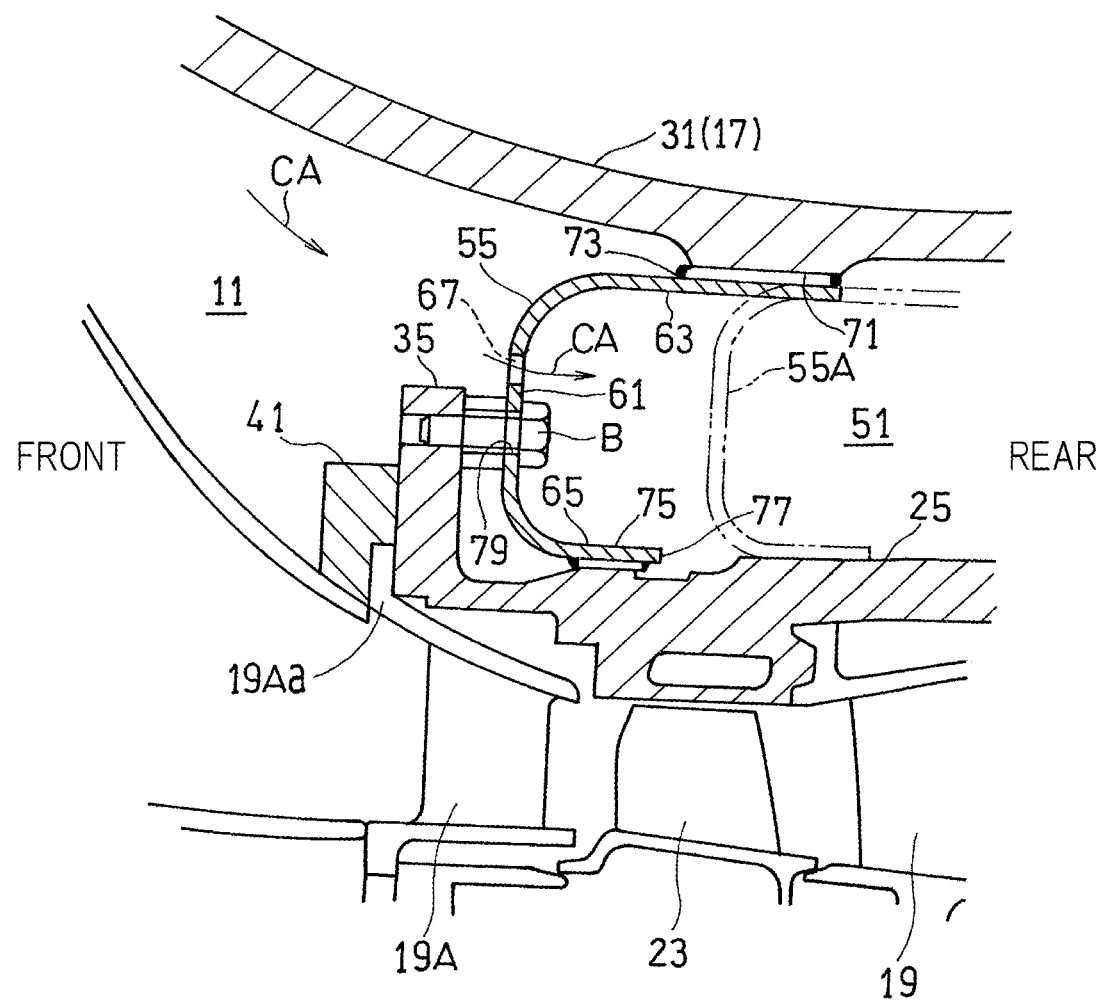
FIG. 5 is an enlarged longitudinal cross-sectional view showing an area at and around the partitioning member used for the bleeding structure of the gas turbine engine in FIG. 2.

As shown in FIG. 5, the turbine housing portion 31 of the engine housing 17 has an inner circumferential surface provided with an annular housing fitting surface portion 71 protruding radially inward. The housing fitting surface portion 71 is formed such that the inner circumferential surface thereof is substantially parallel to the axial direction in a longitudinal cross-sectional view. Meanwhile, the outer-diameter-side leg portion 63 of the partitioning member 55 has an outer circumferential surface provided with an annular outer-diameter-side fitting surface portions 73 protruding radially outward. The outer-diameter-side fitting surface portions 73 are formed such that the outer circumferential surfaces thereof are substantially parallel to the axial direction in a longitudinal cross-sectional view.

The turbine casing 25 has an outer circumferential surface provided with an annular turbine casing fitting surface portion 75 protruding radially outward. The turbine casing fitting surface portion 75 is formed such that the outer circumferential surface thereof is substantially parallel to the axial direction in a longitudinal cross-sectional view. Meanwhile, the inner-diameter-side leg portion 65 of the partitioning member 55 has an inner circumferential surface provided with an annular inner-diameter-side fitting surface portion 77 protruding radially inward. The inner-diameter-side fitting surface portion 77 is formed such that the inner circumferential surface thereof is substantially parallel to the axial direction in a longitudinal cross-sectional view. All of or some of the fitting surface portions 71 to 77 provided to the members may be omitted. However, by providing the fitting surface portions 71 to 77, a gap is more reliably prevented from being formed at a fitting portion between the partitioning member 55 and each of the engine housing 17 and the turbine casing 25.

As shown in FIG. 3, the body portion 61 of the partitioning member 55 is formed with insertion holes 79, through which connection members are inserted, at a plurality of locations in the circumferential direction. As shown in FIG. 5, at the plurality of locations in the circumferential direction, the connection members such as bolts B are inserted through the insertion holes 79 of the body portion 61, and fastened to the connection flange portion 35 of the turbine casing 25, so that the body portion 61 of the partitioning member 55 is attached to the turbine casing 25.

In the present embodiment, as described above, the example in which the body portion 61 and the inner-diameter-side leg portion 65 of the partitioning member 55 are supported by a front end portion, of the turbine casing 25, that covers the first stage stator blade 19A is described. However, the structure for supporting the partitioning member 55 is not limited thereto. For example, as shown in FIG. 5 by alternate long and two short dashes lines, a structure may be employed in which a partitioning member 55A is arranged slightly rearward, a flange (not shown) is provided on the outer circumferential surface of a portion (or a portion rearward thereof), of the turbine casing 25, that covers the first stage rotor blade 23, and the body portion 61 of the partitioning member 55 is fastened to the flange by bolts, so that the partitioning member 55 is supported by the turbine casing 25. By the body portion 61 being included as a portion, of the partitioning member 55, that is supported by the turbine support member, the partitioning member 55 can be stably supported. However, the partitioning member 55 does not need to be supported at the body portion 61. For example, the partitioning member 55 may be supported at only the inner-diameter-side leg portion 65. In either case, the partitioning member 55 is attached to the turbine casing 25 functioning as the turbine support member for supporting the turbine 5 on the engine housing 17, and thus, by effectively using an existing component of the gas turbine GE, increase in the number of parts due to provision of the partitioning member 55 can be suppressed.

In the gas turbine engine bleeding structure according to the present embodiment, the compressed air CA in the chamber 11 shown in FIG. 2 collides with the partitioning member 55 and flows in the circumferential direction, and subsequently flows through the plurality of communication holes 67 of the partitioning member 55 into the bleeding space 51 formed on the downstream side relative to the partitioning member 55. As a result thereof, uneven flow of the compressed air CA in the circumferential direction in the chamber 11 is suppressed, whereby the speed distribution of the compressed air CA becomes even. Therefore, the compressed air CA flowing from the compressor 1 toward the combustors 3 is prevented from flowing unevenly in the circumferential direction. Furthermore, such an effect is obtained by providing the partitioning member 55 that separates the bleeding space 51 from the chamber 11, and thus, while the size of the entire gas turbine engine is prevented from becoming large, uneven flow of the compressed air CA in the circumferential direction in the engine is suppressed, whereby stable combustion can be ensured in the combustors 3.

The compressed air CA in the bleeding space 51 is bled from the bleeding space 51 through the bleeding duct 53 to the outside of the gas turbine GE. By providing the partitioning member 55 having the above-described configuration, uneven flow of the compressed air CA in the gas turbine GE is effectively suppressed, even without providing a plurality of bleeding ducts at equal intervals in the circumferential direction. Therefore, in the present embodiment, an example is shown in which only one bleeding duct 53 is provided to the engine housing 17 so that the size of the entire gas turbine engine is suppressed from becoming large. However, the number of bleeding ducts to be provided to the engine housing 17 is not limited to one.

In the present embodiment, although, as described above, the plurality of communication holes 67 are arranged in the partitioning member 55 at equal intervals in the circumferential direction, the plurality of communication holes 67 do not necessarily need to be arranged at equal intervals. For example, the plurality of communication holes 67 may be arranged such that an interval between the communication holes 67 is large in a region in the circumferential direction close to the bleeding duct 53, and an interval between the communication holes 67 is small in a region in the circumferential direction further apart from the bleeding duct 53. In addition, in the present embodiment, although the opening areas of the plurality of communication holes 67 of the partitioning member are equal to one another, the opening areas may be different among the communication holes 67. For example, the opening areas of the communication holes 67 may be small in a region in the circumferential direction close to the bleeding duct 53, and the opening areas of the communication holes 67 may be large in a region in the circumferential direction further apart from the bleeding duct 53. With this configuration, uneven flow of the compressed air CA in the circumferential direction is more effectively suppressed on the upstream side relative to the partitioning member 55.

In addition, although, in the present embodiment, the gas turbine engine that uses an air as a working gas is described as an example of the gas turbine engine to which the bleeding structure is applied, the bleeding structure may be applied also to a gas turbine engine that uses a working gas, other than air, such as methane gas.

Although the present invention has been described above in connection with the preferred embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

1 . . . Compressor
3 . . . Combustor
5 . . . Turbine
11 . . . Chamber
17 . . . Engine housing
25 . . . Turbine casing
51 . . . Bleeding space
53 . . . Bleeding duct
55 . . . Partitioning member
67 . . . Communication hole
69 . . . Slit
CA . . . Compressed air (compressed gas)
GE . . . Gas turbine engine

What is claimed is:

1. A bleeding structure, in a gas turbine engine, for bleeding a portion of compressed gas from a compressor, the bleeding structure comprising:
    a chamber configured to receive the compressed gas from the compressor and to supply another portion of the compressed gas to a combustor,
    a turbine casing that covers an outer circumference of a turbine of the gas turbine engine;
    an engine housing that surrounds the turbine casing;
    a bleeding space, formed between the engine housing and the turbine casing, that communicates with the chamber;
    a bleeding duct provided to the engine housing, and configured to guide the portion of the compressed gas from the bleeding space to an outside of the engine housing; and a partitioning member of an annular shape arranged on an upstream side, relative to the bleeding duct, in the bleeding space so as to separate the bleeding space from the chamber, and having a plurality of communication holes through which an upstream side and a downstream side, relative to the partitioning member, communicate with each other, wherein the bleeding space, that is between the engine housing and the turbine casing has a bleeding path configured to guide the portion of the compressed gas from the chamber axially directly to the bleeding duct.

2. The bleeding structure as claimed in claim 1, wherein the partitioning member includes a body portion extending in a radial direction, and an outer-diameter-side leg portion and an inner-diameter-side leg portion respectively extending in an axial direction from radially opposite ends of the body portion, in a longitudinal cross-sectional view along the axial direction, and the plurality of communication holes are formed in the body portion.

3. The bleeding structure as claimed in claim 2, wherein at least one of the outer-diameter-side leg portion and the inner-diameter-side leg portion of the partitioning member is formed with a plurality of slits extending in the axial direction.

4. The bleeding structure as claimed in claim 2, wherein the partitioning member has a U shape or a J shape.

5. The bleeding structure as claimed in claim 1, wherein the partitioning member is attached to a turbine support member that supports the turbine on the engine housing.

6. The bleeding structure as claimed in claim 1, wherein the bleeding duct is axially positioned at a radially outer side of the turbine.

7. The bleeding structure as claimed in claim 1, wherein the bleeding space is within the engine housing, the partitioning member axially separates the bleeding space from the chamber, and the partitioning member is configured such that the plurality of communication holes leads all of the portion of the compressed gas to the bleeding space.

8. The bleeding structure as claimed in claim 1, wherein a forward end of the chamber is aft of a forward end of the combustor.

9. A bleeding structure, in a gas turbine engine, for bleeding a portion of compressed gas from a chamber for receiving the compressed gas from a compressor and supplying another portion of the compressed gas to a combustor, the bleeding structure comprising:

a turbine casing that covers an outer circumference of a turbine of the gas turbine engine;

an engine housing that surrounds the turbine casing and forms, between the engine housing and the turbine casing, a bleeding space that communicates with the chamber;

a bleeding duct provided to the engine housing, and configured to guide the portion of the compressed gas from the bleeding space to an outside of the engine housing; and a partitioning member of an annular shape arranged on an upstream side, relative to the bleeding duct, in the bleeding space so as to separate the bleeding space from the chamber, and having a plurality of communication holes through which an upstream side and a downstream side, relative to the partitioning member, communicate with each other, wherein the partitioning member includes a body portion extending in a radial direction, and an outer-diameter-side leg portion and an inner-diameter-side leg portion respectively extending in an axial direction from radially opposite ends of the body portion, in a longitudinal cross-sectional view along the axial direction, and the plurality of communication holes are formed in the body portion, wherein at least one of the outer-diameter-side leg portion and the inner-diameter-side leg portion of the partitioning member is formed with a plurality of slits extending in the axial direction, and wherein one or more of the plurality of slits extend from and communicate with a respective communication hole of the plurality of communication holes.

10. A bleeding structure, in a gas turbine engine, for bleeding a portion of compressed gas from a compressor, the bleeding structure comprising:

a chamber configured to receive the compressed gas from the compressor and to supply another portion of the compressed gas to a combustor, a turbine casing that covers an outer circumference of a turbine of the gas turbine engine;

an engine housing that surrounds the turbine casing;

a bleeding space, formed between the engine housing and the turbine casing, that communicates with the chamber;

a bleeding duct provided to the engine housing, and configured to guide the portion of the compressed gas from the bleeding space to an outside of the engine housing; and a partitioning member of an annular shape arranged on an upstream side, relative to the bleeding duct, in the bleeding space so as to separate the bleeding space from the chamber, and having a plurality of communication holes through which an upstream side and a downstream side, relative to the partitioning member, communicate with each other, the partitioning member being secured only to the turbine casing.

11. The bleeding structure as claimed in claim 10, wherein the partitioning member includes a body portion extending in a radial direction, and an outer-diameter-side leg portion and an inner-diameter-aide leg portion respectively extending in an axial direction from radially opposite ends of the body portion, in a longitudinal cross-sectional view along the axial direction, and the plurality of communication holes are formed in the body portion.

12. The bleeding structure as claimed in claim 11, wherein at least one of the outer-diameter-aide leg portion and the inner-diameter-aide leg portion of the partitioning member is formed with a plurality of slits extending in the axial direction.

13. The bleeding structure as claimed in claim 11, wherein the partitioning member has a U shape or J shape.

14. The bleeding structure as claimed in claim 12, wherein one or more of the plurality of slits extend from and communicate with a respective communication hole of the plurality of communication holes.

15. The bleeding structure as claimed in claim 10, wherein the partitioning member is attached to a turbine support member that supports the turbine on the engine housing.

16. The bleeding structure as claimed in claim 10, wherein the bleeding duct is axially positioned at a radially outer side of the turbine.

17. The bleeding structure as claimed in claim 10, wherein the bleeding space is within the engine housing, the partitioning member axially separates the bleeding space from the chamber, and the partitioning member is configured such that the plurality of communication holes leads all of the portion of the compressed gas to the bleeding space.

18. The bleeding structure as claimed in claim 10, wherein a forward end of the chamber is aft of a forward end of the combustor.

19. The bleeding structure as claimed in claim 10, wherein the bleeding space, that is between the engine housing and the turbine casing, has a bleeding path configured to guide the portion of the compressed gas from the chamber axially directly to the bleeding duct.

\* \* \* \* \*